UNITED STATES PATENT OFFICE.

MATTHEW GRAFF, OF PITTSBURG, PENNSYLVANIA.

PROCESS OF REDUCING IRON ORES.

SPECIFICATION forming part of Letters Patent No. 393,554, dated November 27, 1888.

Application filed June 20, 1888. Serial No. 277,657. (No specimens.)

*To all whom it may concern:*

Be it known that I, MATTHEW GRAFF, a citizen of the United States, residing at Pittsburg, in the county of Allegheny and State of Pennsylvania, have invented or discovered certain new and useful Improvements in a Process of Reducing Iron Ore, of which improvements the following is a specification.

The invention described herein relates to certain improvements in the art of reducing iron ore, as described and claimed by me in an application for Letters Patent, Serial No. 259,795, filed January 4, 1888.

The invention as described in said application consists in reducing or grinding any suitable carbonaceous material to about the size of coarse sand, then coating, covering, or washing the reduced carbonaceous material with loam, lime, or other suitable material capable of retarding the combustion of the carbonaceous material. This retarding material is preferably applied in the form of a wash, either by pouring it over the carbonaceous material or by immersing the latter in a bath of the retarding material. The carbonaceous material thus protected or washed is mixed with the ore, which has previously been reduced or ground to approximately the same size as the carbonaceous material, in about the proportions of twenty-five to thirty-three per cent., more or less, by weight, of the ore. The mixed ore and carbonaceous material are then charged into a suitable reverberating-furnace, and there subjected to a sufficient degree of heat to liberate the oxygen of the ore and the carbonic oxide of the carbonaceous material and to melt the matrix in which the iron is held. As stated in said application, the coating or wash will prevent a rapid combustion of the carbonaceous material, and to such extent retard the generation of carbonic oxide, thereby affording an opportunity for the chemical union thereof with the oxygen of the ore.

The above-described deoxidation of the ore can be facilitated and more thoroughly effected if, in lieu of a sand bottom such as is customary in reverberating-furnaces, a bottom formed of carbonaceous material be employed, for the reason that greater volumes of carbonic oxide can be generated, and, as the gas generated from such bottom must necessarily pass through the charge, a more effectual and rapid deoxidation of the ore can be effected. In making such a bottom I first arrange a layer of comparatively large lumps of carbonaceous material—*e. g.*, charcoal, coke, coal, or graphite—then a layer of smaller lumps, filling, as far as practicable, the insterstices between the large lumps, and finally a layer of fine material, which fills all the openings between the lumps of the other layers, thereby rendering the bottom comparatively compact. When using easily-combustible material—such as charcoal, coke, or coal—I prefer to coat or cover the material with a retarding agent, as a lime or loam wash; but such protection is not absolutely necessary, as the bottom is protected, at least to a great extent, by the superincumbent charge. The coating or wash may be applied either before the bottom is formed, or the wash may be poured over the carbonaceous material after it has been arranged in the furnace as above described.

The charge is heated to about a cherry-red heat and maintained thereat until the gangue is melted into a fluid slag and until the oxygen has been entirely removed, or practically so, and the metallic iron brought to nature, when it is balled and removed from the furnace.

I claim herein as my invention—

1. As a step in the art of manufacturing steel direct from ore, the herein-described method, which consists in intimately mixing the ore with a carbonaceous material protected as against rapid combustion, and then subjecting the mixed ore and carbonaceous material to the action of a reducing-flame in a furnace having its bottom formed of carbonaceous material, also protected as against rapid combustion, substantially as set forth.

2. As a step in the art of manufacturing steel direct from ore, the herein-described method, which consists in mixing the ore with a carbonaceous material protected as against rapid combustion, and then subjecting the mixed ore and carbonaceous material to the action of a reducing-flame in a furnace having its bottom formed of carbonaceous material protected as against rapid combustion by a coating or wash of lime, substantially as set forth.

In testimony whereof I have hereunto set my hand.

MATTHEW GRAFF.

Witnesses:
DARWIN S. WOLCOTT,
R. H. WHITTLESEY.